M. L. WOOD.
SPOOL CLIP.
APPLICATION FILED NOV. 19, 1914.
1,140,226.
Patented May 18, 1915.
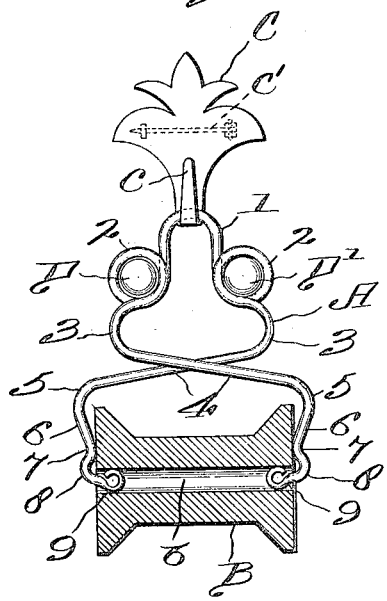
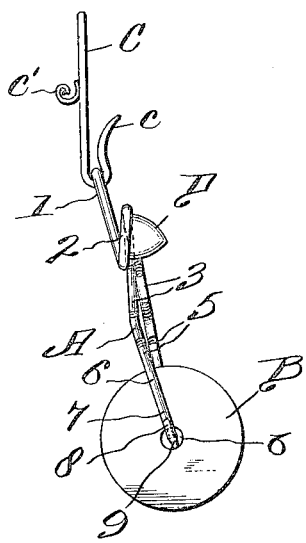
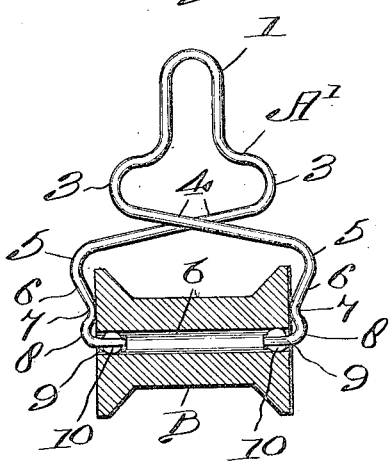
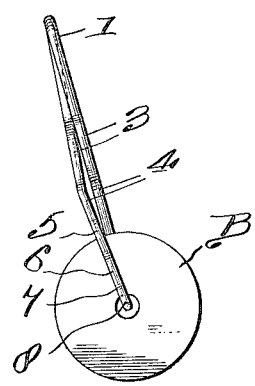
Witnesses
Edwin J Beller
R. J. Mawhinney
Inventor
Moses L. Wood,
By Wilkinson, Giusta & MacKaye,
Attorneys.

UNITED STATES PATENT OFFICE.

MOSES L. WOOD, OF NEW YORK, N. Y.

SPOOL-CLIP.

1,140,226.  Specification of Letters Patent.  Patented May 18, 1915.

Application filed November 19, 1914. Serial No. 873,029.

*To all whom it may concern:*

Be it known that I, MOSES L. WOOD, a citizen of the United States, residing at New York, in the county of New York and State of New York, have invented certain new and useful Improvements in Spool-Clips; and I do hereby declare the following to be a full, clear, and exact description of the invention, such as will enable others skilled in the art to which it appertains to make and use the same.

My present invention relates to improvements in spool holders, and it consists in providing a resilient clip or holder adapted to be readily attached to or removed from the spool, and which is adapted to hold the spool in any convenient place as, for instance, from the clothing of the wearer, or from any convenient hook, or other holding device, or to keep the spool from rolling if laid on any plane surface, such as a table top.

My invention is especially intended to hold a spool of thread for hand sewing in convenient shape for rapid and easy use by a seamstress or tailor, and so designed as to be easily and quickly shifted from spool to spool according to the thread required for use.

Furthermore, my invention is intended to prevent the thread on the spool from being unwound too rapidly, and it also provides a distinguishing means for conveniently selecting any particular spool from a work-basket or other receptacle.

My invention will be understood by reference to the accompanying drawings, in which:—

Figure 1 shows one form of the invention as supported from a brooch, the spool being shown in section; Fig. 2 is a side elevation of the device shown in Fig. 1; and Figs. 3 and 4 are similar views to Figs. 1 and 2 showing a somewhat simplified form of construction.

Referring first to Figs. 1 and 2, A represents a resilient clip made of resilient wire, or rod of metal, which may be either rounded or squared as desired, and which is provided with a central loop 1 adapted to engage a suitable hook, or to rest on a plane surface when the spool with its holder is laid on same. Adjoining this central loop are two circular loops 2. Beneath same the rod or wire is bent, as at 3, forming two members 4 crossing each other, and which are bent again, as at 5, to form longitudinally-projecting legs 6, which legs are bent inward, as at 7, to bear against the ends of the spool and form a frictional engagement therewith; and the bent portion 8 terminates in inwardly-projecting arms 9, whose ends may be bent over, as shown, so as to prevent the same from catching in the various fabrics, yarn, or the like, which would be ordinarily found in a work-basket, and yet which are of such size as to freely enter into the bore $b$ of the spool B. By pressing on the parts 3—3 of the clips, the ends engaging the spool will be pressed outward releasing the spool, and a new spool may be readily inserted between these two ends, and if the pressure on the parts 3—3 be released the clip will automatically engage the spool and the curved portions 7—7 will bear against the end thereof, thus holding the same in frictional engagement and permitting the spool to be readily turned, yet applying a friction brake on same to prevent the spool from continuing the rotary unwinding motion after the tension on the thread has been withdrawn.

The holder may be suspended from the hook $c$ of the brooch C fastened by the hinge pin C' to the waist of the seamstress, or coat of the tailor; or it may be suspended from any convenient hook, or if laid on the table the tongue 1 will rest on the plane surface of the table and will tend to prevent the spool from rolling off the same. Furthermore, it will be evident that the device, if left attached to the spool, would tend to distinguish any spool recently in use from others in the work-basket, or other receptacle, where large numbers of spools are ordinarily kept. The loops 2 form very convenient holders for the pin cushions or emery bags D and D', which may be used to carry a few pins or needles likely to be required by the user of the holder.

The form of device shown in Figs. 3 and 4 differs only from that shown in Figs. 1 and 2 in that the loops 2 are omitted, and that instead of having the ends 9 of the clips bent over, as shown in Fig. 1, the ends are provided with suitable beads or bulbs 10 which may be secured thereon in any convenient way, as by soldering, upsetting the ends of the wire, or the like. Of course, the ends of the rod or wire may be left without such bulbs or bends, but I prefer to have a bulb or loop at each end to prevent said ends from catching in various articles in the work-basket of the user.

The clip should preferably be formed of round wire, but for advertising purposes this wire may be flattened on one or both sides, or may be rectangular or varying in cross section, thus giving great rigidity in the plane of such flattening, and also providing a surface for stamping letters or designs thereon.

Any suitable resilient metal or alloy may be used in the construction of the clip, such as steel, brass, wire or the like.

While the resilient clip will adapt itself, within limits, to various sizes of spools, it should preferably be made in several sizes for use with large and small spools as desired.

It will be obvious that various other modifications might be made in the herein described construction which could be used without departing from the spirit of my invention.

Having thus described my invention, what I claim and desire to secure by Letters Patent of the United States is:—

A resilient holder for spools comprising a rod or wire made of resilient material and provided with a central loop with outwardly curved portions beyond said loop terminating in members crossing each other, said members terminating in longitudinally-projecting legs bent inwardly to bear against the ends of the spool, and having their ends adapted to project into the bore of the spool, substantially as described.

In testimony whereof, I affix my signature, in presence of two witnesses.

MOSES L. WOOD.

Witnesses:
GEORGE A. FOOTE,
FRANK WALTHER.